United States Patent [19]

Kennedy

[11] Patent Number: 5,575,556
[45] Date of Patent: Nov. 19, 1996

[54] REMOTE CONTROL ILLUMINATING AND MAGNIFYING DEVICE

[76] Inventor: Wesley H. Kennedy, 40 - 11th Street, Weyburn, Saskatchewan, Canada, S4H-1H9

[21] Appl. No.: 617,642

[22] Filed: Mar. 19, 1996

[51] Int. Cl.6 .................................... F21V 33/00
[52] U.S. Cl. ............... 362/109; 362/85; 362/191; 362/234; 362/253; 362/396
[58] Field of Search ............... 362/23, 85, 109, 362/190, 191, 234, 253, 396, 800, 86

[56] References Cited

U.S. PATENT DOCUMENTS 4,905,127  2/1990  Kaminski .................... 362/109
5,486,986  1/1996  Brada ........................ 362/85

*Primary Examiner*—Stephen F. Husar

[57] ABSTRACT

A remote control illuminating and magnifying device for illuminating and magnifying the buttons of a remote control device. The inventive device includes a main body which can be positioned and secured adjacent to a remote control device. A plurality of lights are mounted relative to the main body for illuminating the keys or buttons of the remote control device. A magnifying glass is supported relative to the main body and can be adjustably positioned over a portion of the remote control to magnify the buttons thereof to allow for operation of the remote control in dim lighting conditions and by individuals with reduced visual capacity.

20 Claims, 3 Drawing Sheets

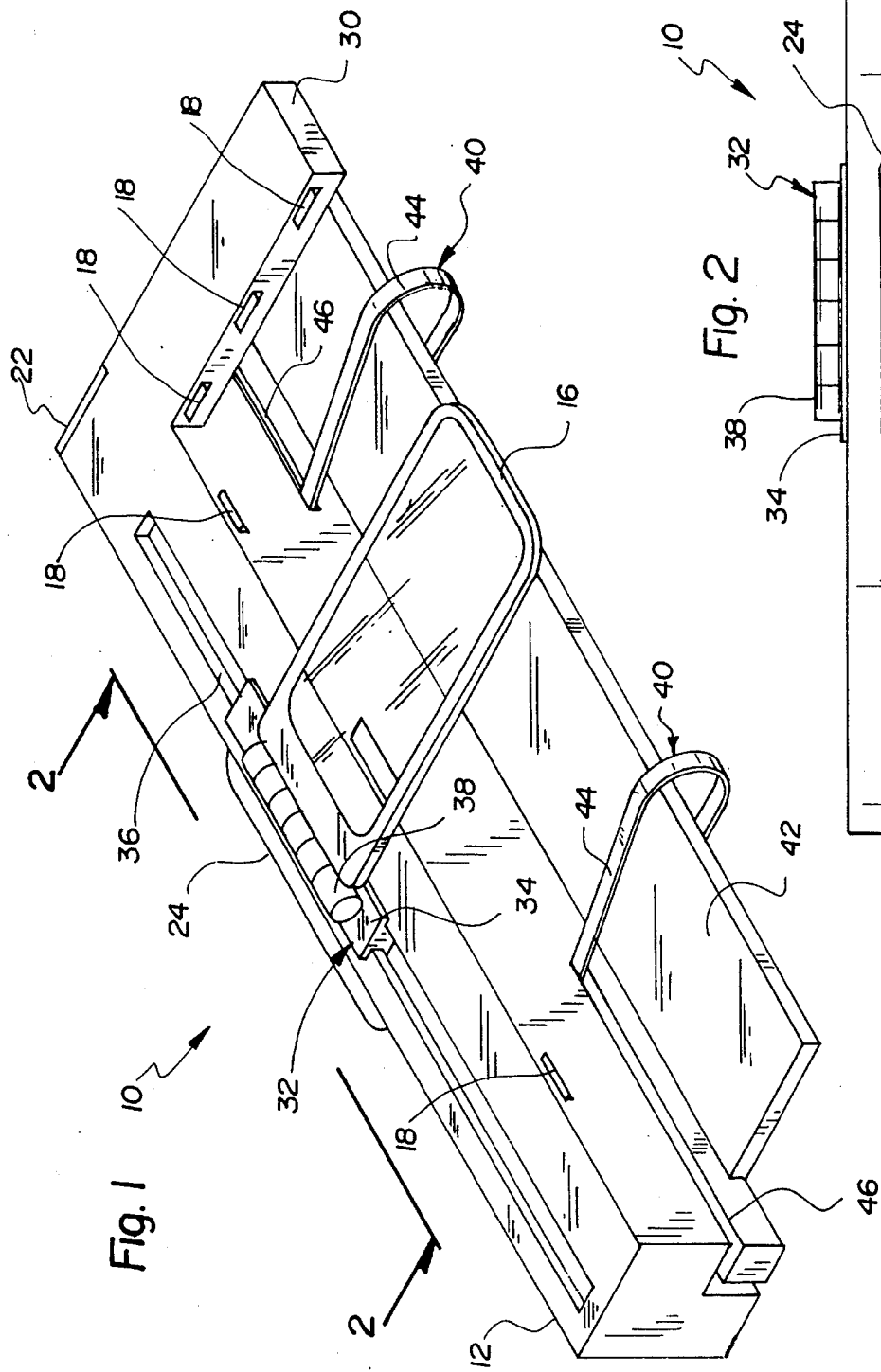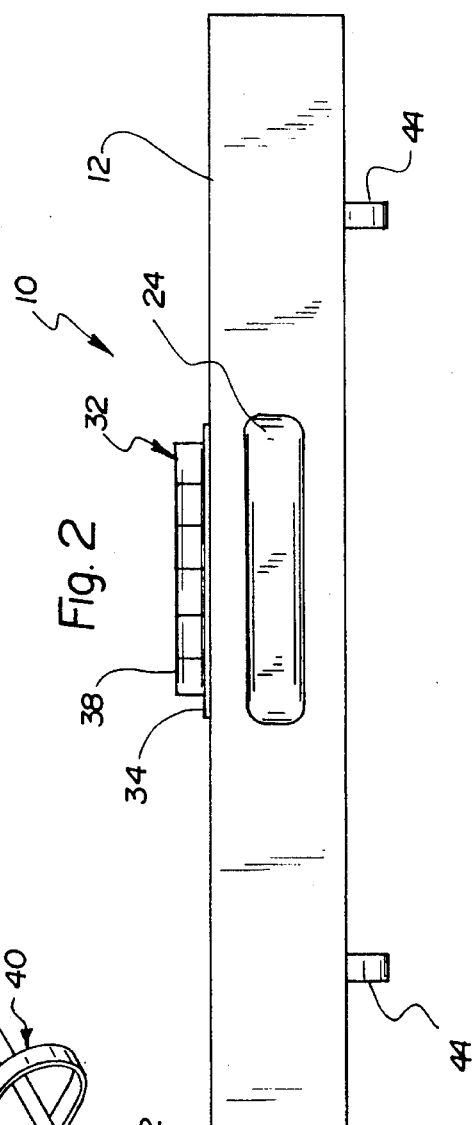

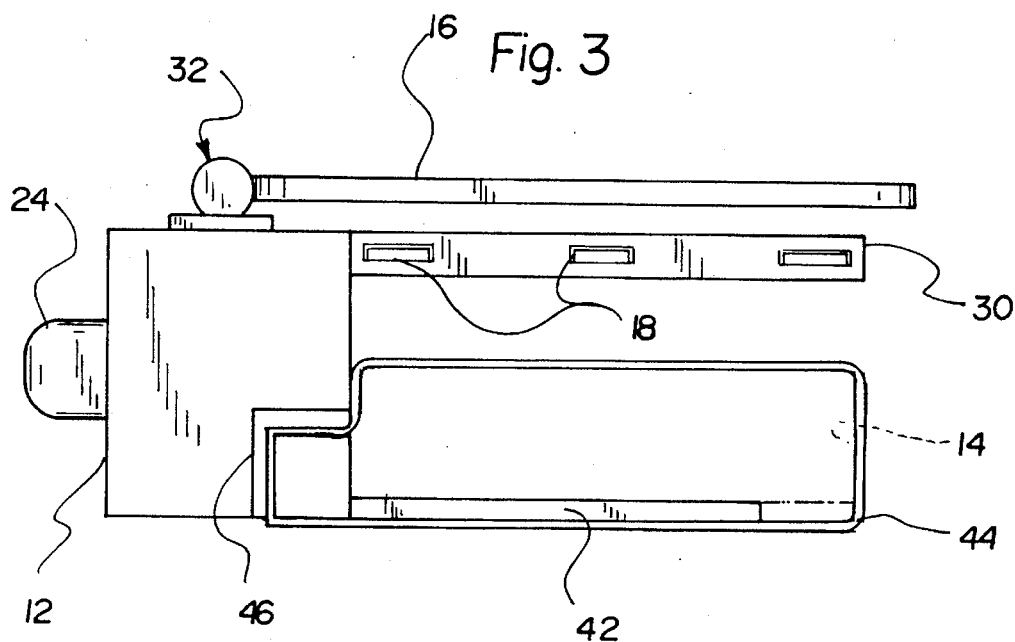
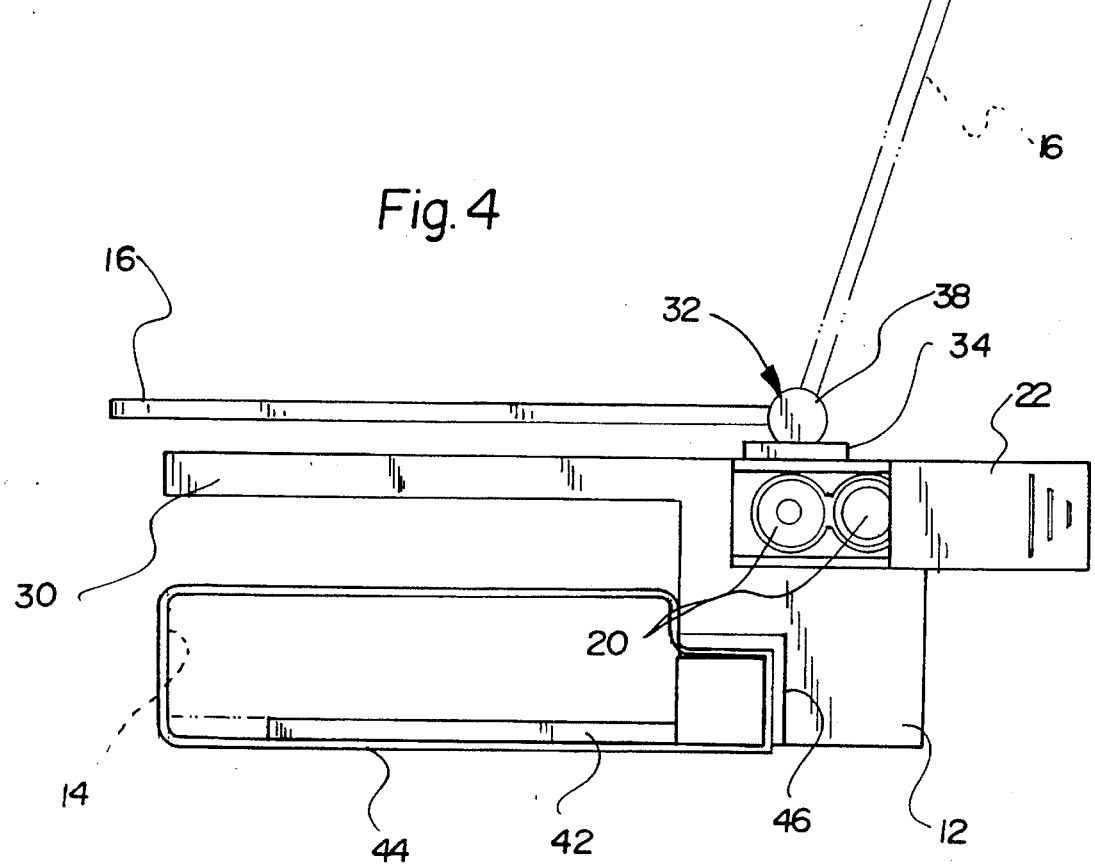

REMOTE CONTROL ILLUMINATING AND MAGNIFYING DEVICE

BACKGROUND OF THE INVENTION

1. Field of the Invention

The present invention relates to remote control devices and more particularly pertains to a remote control illuminating and magnifying device for illuminating and magnifying the buttons of a remote control device.

2. Description of the Prior Art

The use of remote control devices is known in the prior art. More specifically, remote control devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art remote control devices include U.S. Pat. Nos. 5,188,448; 5,122,937; 4,949,230; U.S. Design Pat. Nos. 344,149; 338,734; and 348,741.

While these devices fulfill their respective, particular objectives and requirements, the aforementioned patents do not disclose a remote control illuminating and magnifying device for illuminating and magnifying the buttons of a remote control device which includes a main body positionable and securable adjacent to a remote control device, a plurality of lights mounted relative to the main body for illuminating the buttons of the remote control device, and a magnifying glass supported relative to the main body that can be adjustably positioned over a portion of the remote control to magnify the buttons thereof to allow for operation of the remote control in dim lighting conditions and by individuals with reduced visual capacity.

In these respects, the remote control illuminating and magnifying device according to the present invention substantially departs from the conventional concepts and designs of the prior art, and in so doing provides an apparatus primarily developed for the purpose of illuminating and magnifying the buttons of a remote control device.

SUMMARY OF THE INVENTION

In view of the foregoing disadvantages inherent in the known types of remote control devices now present in the prior art, the present invention provides a new remote control illuminating and magnifying device construction wherein the same can be utilized for illuminating and magnifying the buttons of a remote control device. As such, the general purpose of the present invention, which will be described subsequently in greater detail, is to provide a new remote control illuminating and magnifying device apparatus and method which has many of the advantages of the remote control devices mentioned heretofore and many novel features that result in a remote control illuminating and magnifying device which is not anticipated, rendered obvious, suggested, or even implied by any of the prior art remote control devices, either alone or in any combination thereof.

To attain this, the present invention generally comprises a remote control illuminating and magnifying device for illuminating and magnifying the buttons of a remote control device. The inventive device includes a main body which can be positioned and secured adjacent to a remote control device. A plurality of lights are mounted relative to the main body for illuminating the keys or buttons of the remote control device. A magnifying glass is supported relative to the main body and can be adjustably positioned over a portion of the remote control to magnify the buttons thereof to allow for operation of the remote control in dim lighting conditions and by individuals with reduced visual capacity.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new remote control illuminating and magnifying device apparatus and method which has many of the advantages of the remote control devices mentioned heretofore and many novel features that result in a remote control illuminating and magnifying device which is not anticipated, rendered obvious, suggested, or even implied by any of the prior art tool guides, either alone or in any combination thereof.

It is another object of the present invention to provide a new remote control illuminating and magnifying device which may be easily and efficiently manufactured and marketed.

It is a further object of the present invention to provide a new remote control illuminating and magnifying device which is of a durable and reliable construction.

An even further object of the present invention is to provide a new remote control illuminating and magnifying device which is susceptible of a low cost of manufacture with regard to both materials and labor, and which accordingly is then susceptible of low prices of sale to the consuming public, thereby making such remote control illuminating and magnifying devices economically available to the buying public.

Still yet another object of the present invention is to provide a new remote control illuminating and magnifying device which provides in the apparatuses and methods of the prior art some of the advantages thereof, while simultaneously overcoming some of the disadvantages normally associated therewith.

Still another object of the present invention is to provide a new remote control illuminating and magnifying device for illuminating and magnifying the buttons of a remote control device.

Yet another object of the present invention is to provide a new remote control illuminating and magnifying device which includes a main body positionable and securable adjacent to a remote control device, a plurality of lights mounted relative to the main body for illuminating the buttons of the remote control device, and a magnifying glass supported relative to the main body that can be adjustably positioned over a portion of the remote control to magnify the buttons thereof to allow for operation of the remote control in dim lighting conditions and by individuals with reduced visual capacity.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a remote control illuminating and magnifying device according to the present invention.

FIG. 2 is a side elevational view taken from line 2—2 of FIG. 1.

FIG. 3 is a bottom end elevation view of the invention.

FIG. 4 is a top end elevation view of the invention with a battery door thereof partially removed.

DESCRIPTION OF THE PREFERRED EMBODIMENT

Figure 5:
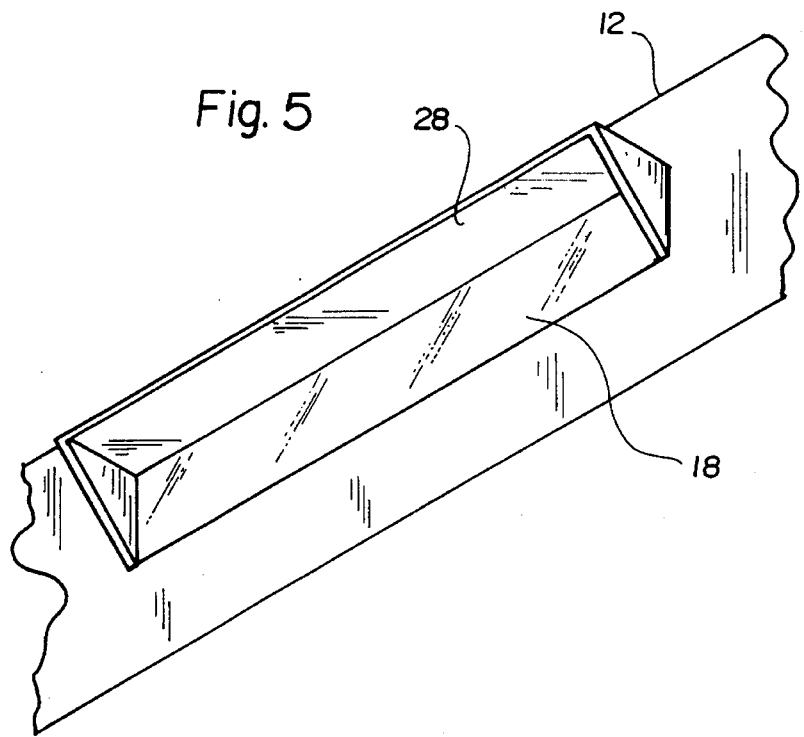
FIG. 5 is an enlarged isometric illustration of a portion of the invention.
Figure 6:
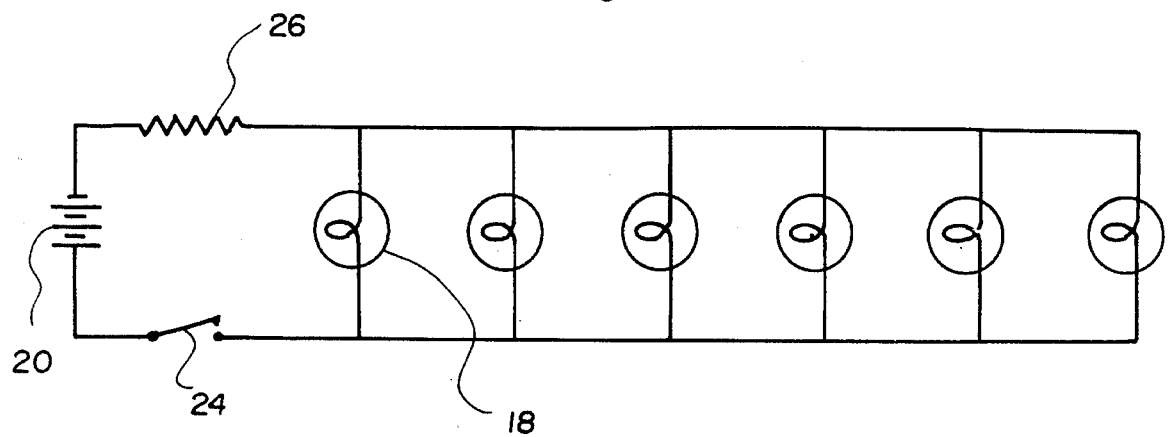
FIG. 6 is an electrical schematic illustration of an electrical circuit of the invention.

With reference now to the drawings, and in particular to FIGS. 1–6 thereof, a remote control illuminating and magnifying device embodying the principles and concepts of the present invention and generally designated by the reference numeral 10 will be described.

More specifically, it will be noted that the remote control illuminating and magnifying device 10 comprises a main body 12 which can be positioned in adjacency relative to a remote control device 14 such as is illustrated in FIGS. 3 and 4 of the drawings. An unlabeled illumination means is mounted relative to the main body and can be activated to dispense light or illumination upon an upper surface of the remote control device 14 so as to allow an individual to see buttons of the remote control device in poor ambient light conditions. A magnifying lens 16 is mounted relative to the main body 12 and can be positioned over the buttons of the remote control device 14 to allow individuals with reduced visual capacity to more easily see the buttons of the remote control device by magnifying the same. Preferably, a sufficient distance is provided between the magnifying lens 16 and the upper surface of the remote control device when the invention 10 is coupled therewith to allow an individual to position a digit of the human hand between the lens 16 and the remote control device to facilitate depression of the buttons thereof.

As shown in the figures, the illumination means of the invention 10 preferably comprises a plurality of lights 18 which are mounted relative to the main body 12. The main body 12 can be shaped so as to define an unlabeled battery compartment within which one or more batteries 20, preferably of the rechargeable nickel cadmium type as shown in FIG. 4, can be positioned for selective electrical communication with the lights 18. A removable door 22 secures the batteries within the main body 12 in a conventional manner. A switch 24 projects from a side of the main body 12 and is positioned in electrical communication with the lights 18 and the batteries 20 (when installed in the invention) to permit for selective manual energization of the lights 18 as desired by an end user. The switch 24 may be of the push-on-push-off type or may be a momentary-on type switch. As shown in the schematic illustration of FIG. 6, the switch 24 is wired in series with the lights 18 and battery 24. A resistor 26 may be provided in the circuit to reduce the voltage of the batteries 24 for the particular type of lights 18 utilized. In this respect, the lights 18 may comprises incandescent lamps or light emitting diodes (LEDS). As shown in FIG. 5, the lights 18 may each include a hood 28 projecting thereover for directing light only onto the upper surface of the remote control device 14.

With continuing reference to FIGS. 1 through 4, it can be shown that the illumination means of the invention 10 may additionally comprise an upper lighting arm 30 projecting from the main body 12 which supports one or more of the lights 18. By this structure, the remote control device 14, when coupled to the invention 10, will be illuminated from two directions to reduce shadows and improve visibility of the buttons of the remote control device.

As shown in FIGS. 1 through 4, the magnifying lens 16 is mounted relative to the main body 12 by an adjustable lens mounting means 32 which allows the magnifying lens 16 to be movably positioned along the main body 12. The adjustable lens mounting means 32 may also further allow the magnifying lens 16 to be pivoted relative to the main body 12, as shown in FIG. 4. By this structure, the magnifying lens 16 can be adjustably positioned in a variety of orientations to accommodate and allow insertion and operation of the various sizes of remote control devices currently available. To this end, the adjustable lens mounting means 32 preferably comprises a sliding member 34 slidably mounted within a track 36 extending into the main body 12. A hinge 38 is mounted to the sliding member 34 and coupled to the magnifying lens 16 to pivotally mount the same relative to the sliding member. The hinge 38 may be made detachable such that replacement of the magnifying lens 16 can be accomplished as needed should the lens be broken for any reason.

To facilitate coupling of the invention 10 to a remote control device 14, a remote control securing means 40 is attached to the main body 12, as shown in FIG. 1 of the drawings. The remote control securing means 40 comprises a support plate 42 mounted to the main body 12 upon which the remote control device 14 can be positioned, as shown in FIGS. 3 and 4. One or more elastic bands 44 are mounted relative to the main body 12 for extension about a portion of the remote control device 14 whereby resilient contraction of the bands about the remote control device 14 will secure the same relative to the main body 12. To this end, the main body 12 can be shaped to define one or more slots 46 through which the elastic bands 44 extend to couple them to the main body 12. By this structure, the elastic bands can be adjustably positioned within the slots 46 so as to extend in a desired position over a remote control device such as between the buttons thereof. The elastic bands 44 are preferably covered with an unillustrated cloth or fabric covering to improve the appearance and durability thereof.

In use, the remote control illuminating and magnifying device 10 according to the present invention can be easily utilized for illuminating and magnifying the buttons of a remote control device. Variations and modifications of the invention 10 include a removable or detachable magnifying lens 16, and non-skid lining along the support plate to prevent unintentional movement of the remote control device 14 relative thereto.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A remote control illuminating and magnifying device comprising:

a main body positionable in adjacency relative to a remote control device;

an illumination means mounted relative to the main body for dispensing illumination upon an upper surface of the remote control device when the remote control device is positioned relative to the main body;

a magnifying lens mounted relative to the main body for positioning over buttons of the remote control device when the remote control device is positioned relative to the main body.

2. The remote control illuminating and magnifying device of claim 1, wherein the illumination means comprises at least one light mounted relative to the main body.

3. The remote control illuminating and magnifying device of claim 2, wherein the main body is shaped so as to define a battery compartment within which at least one battery can be positioned.

4. The remote control illuminating and magnifying device of claim 3, wherein the illumination means comprises a switch mounted relative to the main body and positioned in electrical communication with the light and positionable into electrical communication with a battery.

5. The remote control illuminating and magnifying device of claim 4, wherein the illumination means comprises a plurality of lights in electrical communication with the switch, the illumination means further comprising an upper lighting arm projecting from the main body, with at least one of the plurality of lights being mounted to the upper lighting arm.

6. The remote control illuminating and magnifying device of claim 1, wherein the magnifying lens is mounted relative to the main body by an adjustable lens mounting means for permitting the magnifying lens to be movably positioned along the main body.

7. The remote control illuminating and magnifying device of claim 6, wherein the adjustable lens mounting means comprises a sliding member slidably mounted relative to the main body; and a hinge mounted to the sliding member and coupled to the magnifying lens to pivotally mount the magnifying lens relative to the sliding member.

8. The remote control illuminating and magnifying device of claim 1, and further comprising a remote control securing means coupled to the main body for securing a remote control device relative to the main body.

9. The remote control illuminating and magnifying device of claim 8, wherein the remote control securing means comprises a support plate mounted to the main body upon which a remote control device can be positioned; and at least one elastic band mounted relative to the main body for extension about a portion of the remote control device whereby resilient contraction of the bands about the remote control device will secure the remote control device relative to the main body.

10. The remote control illuminating and magnifying device of claim 9, wherein the main body is shaped so as to define at least one slot through which the elastic band extends to movably couple the elastic band to the main body, whereby the elastic band can be adjustably positioned within the slot.

11. A remote control illuminating and magnifying device comprising:

a remote control device;

a main body positionable in adjacency relative to the remote control device;

an illumination means mounted relative to the main body for dispensing illumination upon an upper surface of the remote control device;

a magnifying lens mounted relative to the main body for positioning over buttons of the remote control device.

12. The remote control illuminating and magnifying device of claim 11, wherein the illumination means comprises at least one light mounted relative to the main body.

13. The remote control illuminating and magnifying device of claim 12, wherein the main body is shaped so as to define a battery compartment within which at least one battery can be positioned.

14. The remote control illuminating and magnifying device of claim 13, wherein the illumination means comprises a switch mounted relative to the main body and positioned in electrical communication with the light and positionable into electrical communication with a battery.

15. The remote control illuminating and magnifying device of claim 14, wherein the illumination means comprises a plurality of lights in electrical communication with the switch, the illumination means further comprising an upper lighting arm projecting from the main body, with at least one of the plurality of lights being mounted to the upper lighting arm.

16. The remote control illuminating and magnifying device of claim 11, wherein the magnifying lens is mounted relative to the main body by an adjustable lens mounting means for permitting the magnifying lens to be movably positioned along the main body.

17. The remote control illuminating and magnifying device of claim 16, wherein the adjustable lens mounting means comprises a sliding member slidably mounted relative to the main body; and a hinge mounted to the sliding member and coupled to the magnifying lens to pivotally mount the magnifying lens relative to the sliding member.

18. The remote control illuminating and magnifying device of claim 11, and further comprising a remote control securing means coupled to the main body for securing a remote control device relative to the main body.

19. The remote control illuminating and magnifying device of claim 18, wherein the remote control securing means comprises a support plate mounted to the main body upon which a remote control device can be positioned; and at least one elastic band mounted relative to the main body for extension about a portion of the remote control device whereby resilient contraction of the bands about the remote control device will secure the remote control device relative to the main body.

20. The remote control illuminating and magnifying device of claim 19, wherein the main body is shaped so as to define at least one slot through which the elastic band extends to movably couple the elastic band to the main body, whereby the elastic band can be adjustably positioned within the slot.

\* \* \* \* \*